United States Patent
McNamara, Jr.

[19]

[11] Patent Number: 6,058,245
[45] Date of Patent: *May 2, 2000

[54] ELECTRIC BOOST HEATER FOR DEEP FRYER

[75] Inventor: Albert Charles McNamara, Jr., San Antonio, Tex.

[73] Assignee: AFC Enterprises, Inc., Atlanta, Ga.

[*] Notice: This patent issued on a continued prosecution application filed under 37 CFR 1.53(d), and is subject to the twenty year patent term provisions of 35 U.S.C. 154(a)(2).

[21] Appl. No.: 09/129,264

[22] Filed: Aug. 5, 1998

[51] Int. Cl.$^7$ .................................................. A47J 37/12
[52] U.S. Cl. .................... 392/308; 219/441; 219/476; 219/483; 99/331; 99/403; 392/441; 126/374
[58] Field of Search ................... 392/308, 307, 392/441, 444, 447, 454, 451, 449, 498, 500; 219/441, 442, 438, 476–480, 483, 484, 486, 487; 99/331, 403, 408–418; 126/373, 374, 391; 426/438

[56] References Cited

U.S. PATENT DOCUMENTS

| | | | |
|---|---|---|---|
| 1,436,247 | 11/1922 | Hagan | 392/308 |
| 1,678,885 | 7/1928 | Thomas | 219/441 |
| 1,823,048 | 9/1931 | Hughes | 392/500 |
| 1,849,175 | 3/1932 | Clark et al. | 392/500 |
| 1,990,351 | 2/1935 | Shroyer | 99/331 |
| 2,042,182 | 5/1936 | Knowles | 219/483 |
| 2,051,658 | 8/1936 | Stiebel | 392/500 |
| 2,437,262 | 3/1948 | Levitt et al. | 392/498 |
| 2,756,321 | 7/1956 | Pappas | 99/403 |
| 4,289,477 | 9/1981 | Moore et al. | 431/171 |
| 4,481,873 | 11/1984 | Keating | 99/403 |
| 5,232,151 | 8/1993 | Mercer et al. | 236/20 R |
| 5,352,862 | 10/1994 | Barr | 219/484 |
| 5,417,202 | 5/1995 | Cote | 126/391 |
| 5,706,717 | 1/1998 | Barner | 99/330 |
| 5,910,206 | 6/1999 | McNamara | 99/330 |
| 5,960,157 | 9/1999 | McGraw | 392/308 |

FOREIGN PATENT DOCUMENTS

| | | | |
|---|---|---|---|
| 2043052 | 4/1992 | Canada | 392/451 |
| 56100 | 7/1982 | European Pat. Off. | 392/308 |
| 2610089 | 7/1988 | France . | |
| 2730397 | 8/1996 | France . | |
| 3319038 | 11/1984 | Germany . | |
| 19731288 | 2/1999 | Germany . | |
| 8-131344 | 5/1996 | Japan . | |
| 8-238171 | 9/1996 | Japan . | |
| 98497 | 3/1923 | Switzerland | 392/454 |
| 650912 | 8/1985 | Switzerland | 392/500 |
| 459475 | 1/1937 | United Kingdom | 392/500 |
| 831165 | 3/1960 | United Kingdom | 392/500 |
| 1049874 | 11/1966 | United Kingdom . | |
| 1441967 | 7/1976 | United Kingdom . | |
| 2276243 | 9/1994 | United Kingdom . | |

OTHER PUBLICATIONS

Conner et al., "Development and Application of a Uniform Testing Procedure for Open, Deep–fat Fryers," PG&E, Research and Development Dept., report 008.1–90.22, 1991.

*Primary Examiner*—John A. Jeffery
*Attorney, Agent, or Firm*—Banner & Witcoff, Ltd.

[57] ABSTRACT

A fryer system having a vat containing shortening, a first heater for supplying heat to the shortening, and a second heater for supplying heat to the shortening. The second heater is preferably activated only when the temperature of the shortening falls below a predetermined minimum temperature and disabled when the temperature of the shortening reaches a predetermined maximum temperature. In one preferred embodiment, the first heater is a heat exchanger with a gas burner while the second heater is an electric heating element. In another preferred embodiment, the first heater is an electric heating element and the second heater is an autotransformer supplying an overvoltage to the electric heating element. A method for operating a heating system for a fryer is also disclosed.

19 Claims, 5 Drawing Sheets

ELECTRIC BOOST HEATER FOR DEEP FRYER

INTRODUCTION

The present invention relates to a deep fryer, and more particularly, to an improved deep fryer having an electric boost heater.

BACKGROUND

Deep fryers are commercially used by restaurants, institutional kitchens, and fast food establishments for cooking a variety of food products, such as french fries, fish, fried chicken, and the like. The fryer must not only accommodate the individual heating requirements of each particular food product, but it must also maintain consistency and uniformity of taste and texture during the cooking process. The food product is cooked by totally immersing it within a vat or tank that is filled with heated oil or shortening. The oil may be heated using a flow of heated gas that is forced or drawn through flow passages that are located within or external to the cooking vat. A gas burner is provided to heat the gas circulating within the heat exchanger. The oil may instead be heated with an electric heating element disposed in the oil. Examples of other gas burner and electric prior art systems are shown in a report by Pacific Gas & Electric entitled "Development and Application of a Uniform Testing Procedure for Open, Deep-Fat Fryers," dated October 1991.

When cold product for cooking is dropped into the vat, the temperature of the shortening drops. The heating mechanism then tries to reheat the shortening. At times, the cooking loads and temperatures are such that the cooking cycle is completed and the cooked product removed before the fryer can return to its original (pre-drop) setpoint temperature. After the product is removed, the fryer returns to its setpoint temperature. The period of time from when the product is removed until the time at which the fryer returns to it setpoint temperature is known as the recovery time. The fryer is not available for proper cooking during the recovery time. Any food dropped into the vat before the setpoint is reached may be inferior in texture, taste or temperature. Additionally, the product that had previously been dropped into the vat, and caused the drop in temperature of the shortening, may not have had the ideal cooking conditions during its cooking cycle and may, therefore, suffer some degradation in quality.

One attempt at a solution to this problem is what is known as flextime, wherein the actual temperature of the shortening is compared to the ideal temperature, and the cooking time is extended to accomplish the same heat transfer to the food product. This approach, however, does not assure proper texture or taste as the cooking often depends on having the right temperature at the right time rather than having some compensated time to account for a variance in temperature.

Electric flyers have been found to return to setpoint temperature in a shorter time than gas fryers of the same power input rating. Electric fryers, however, are more expensive to operate than gas fryers due to the higher cost of electric energy. Additionally, the quickness of an electric fryer is not needed at all times, for example, during warm-up and idling periods, and for certain light cooking loads.

It is an object of the present invention to provide a boost heater for a deep fryer which reduces or wholly overcomes some or all of the aforesaid difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a fryer system which can economically and quickly heat shortening contained within a vat to its setpoint temperature after product to be cooked is placed in the vat.

In accordance with a first aspect, a fryer system has a fryer including a vat for containing shortening therein, a first heating means supplying heat to the vat when the temperature of the shortening is below a setpoint temperature, and a second heating means supplying heat to the vat. The second heating means operates during only a portion of the operation of the first heating means.

In accordance with another aspect, a fryer system has a fryer including a vat for containing shortening therein. A heat exchanger has a gas burner for supplying heat to a cooking zone of the vat. An electric heating element also supplies heat to the cooking zone.

In accordance with yet another aspect, a method of operating a heating system for a fryer has the following steps: placing a quantity of shortening within a fryer vat; sensing the temperature of the shortening; activating a first heating means when the temperature falls below a setpoint value; activating a second heating means when the temperature falls below a predetermined minimum temperature which is below the setpoint temperature; and deactivating the second heating means when the temperature reaches a predetermined maximum temperature which is above the minimum temperature and below the setpoint temperature.

From the foregoing disclosure, it will be readily apparent to those skilled in the art, that is, those who are knowledgeable or experienced in this area of technology, that the present invention provides a significant technological advance. Preferred embodiments of the boost heater for a deep fryer can provide a quick and economical way of returning shortening contained in the vat of the deep fryer to its setpoint temperature. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

Figure 1:
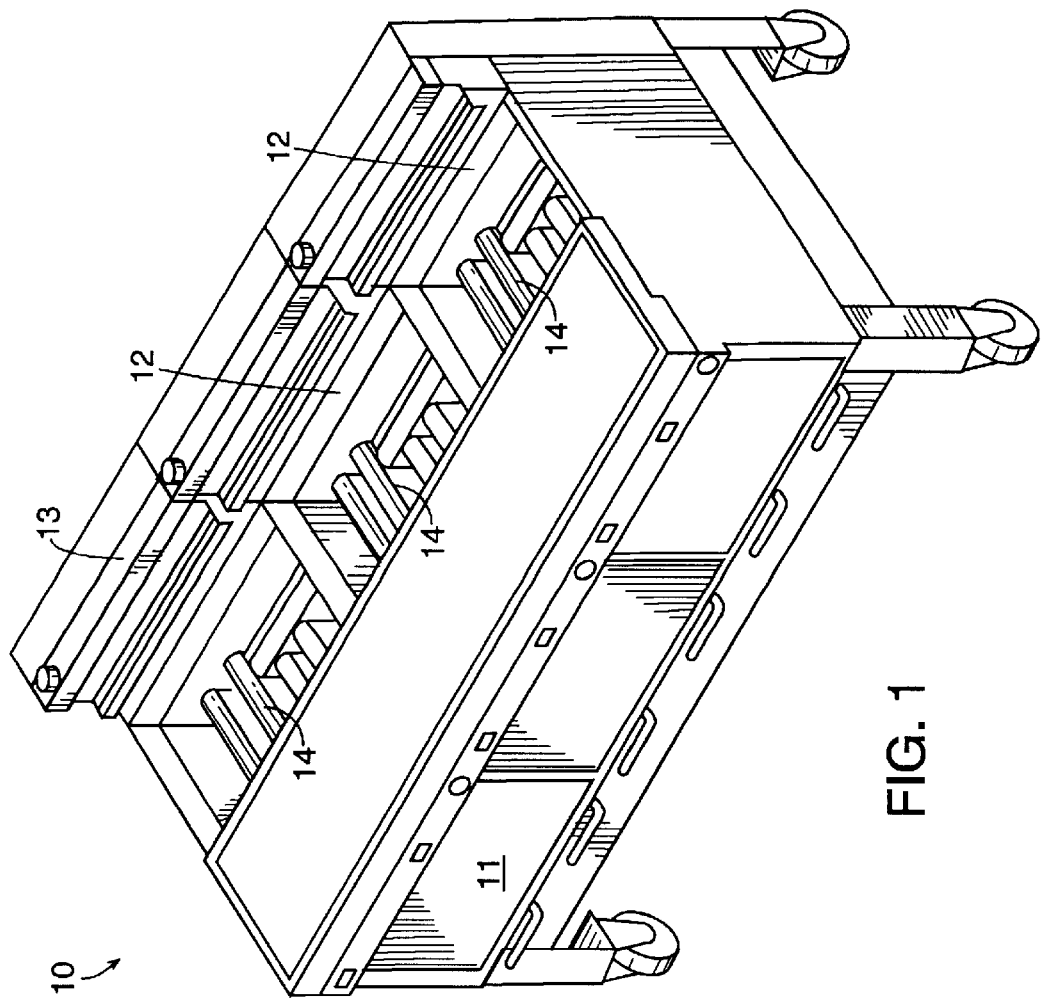
FIG. 1 is a schematic perspective view of a gas fryer containing a heat exchanger according to the present invention.

The figures referred to above are not drawn necessarily to scale and should be understood to present a representation of the invention, illustrative of the principles involved. Some features of the boost heater depicted in the drawings have been enlarged or distorted relative to others to facilitate explanation and understanding. The same reference numbers are used in the drawings for similar or identical components and features shown in various alternative embodiments. Boost heaters, as disclosed herein, will have configurations and components determined, in part, by the intended application and environment in which they are used.

DETAILED DESCRIPTION OF CERTAIN PREFERRED EMBODIMENTS

Figure 2:
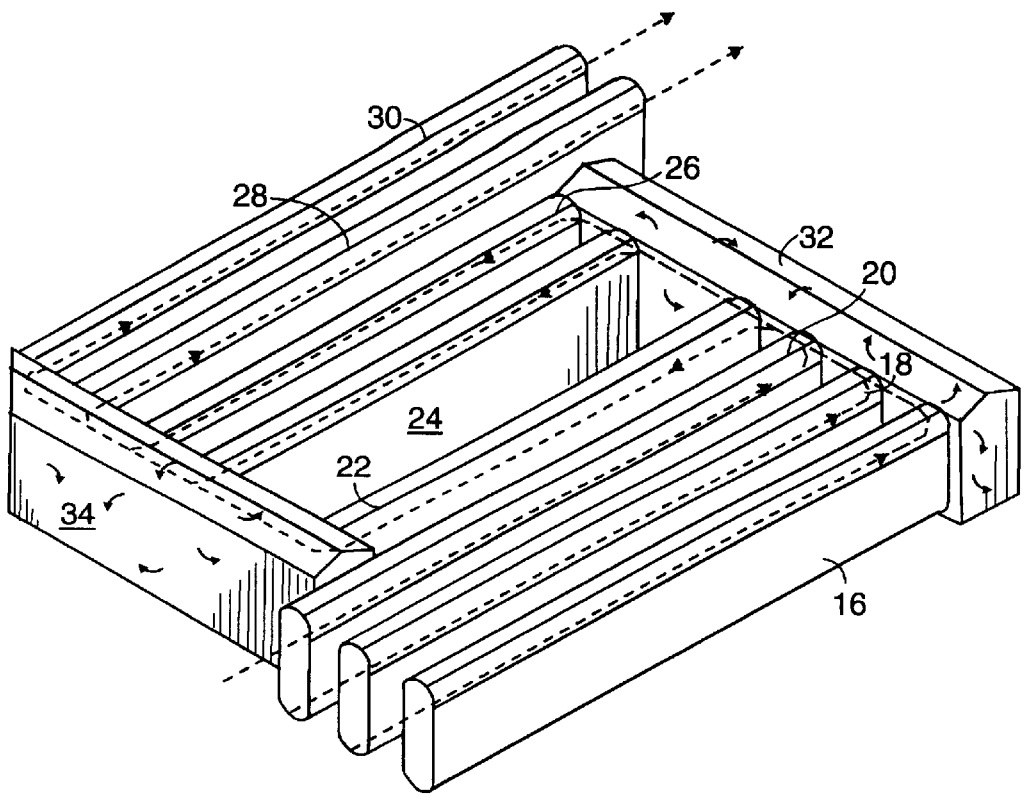
FIG. 2 is a schematic perspective view of the heat exchanger shown in FIG. 1.

Referring to FIG. 1, a gas fryer according to the present invention is shown generally by reference numeral 10. The gas flyer preferably includes a plurality of vats 12 for holding the shortening, oil, or other cooking medium, a heat exchanger 14 for heating the shortening in each vat 12, a burner section 11 for heating the fluid flowing through heat exchanger 14, and may include a blower motor in blower housing 13 for drawing or forcing the heated fluid through heat exchanger 14. Due to its efficiency and economic availability, the heat exchange fluid generally used in the present invention and in prior art gas flyers is air; however, other gaseous fluids or liquids may of course also be considered as the development thereof permits. In the preferred embodiment of FIG. 2, heat exchanger 14 includes a plurality of heat transfer conduits or tubes 16, 18, 20, 22, 24, 26, 28, 30 and two mixing plenums 32, 34. The direction of travel of the heated fluid through heat exchanger 14 is schematically illustrated in FIG. 2 to show the heated fluid entering the vat through inlet heat transfer tubes 16, 18, 20, mixing in plenum 32, passing through heat transfer tubes 22, 24, 26, mixing in plenum 34, and then exiting the vat through outlet heat transfer tubes 28, 30. A further description of the heat exchanger is provided in U.S. Pat. Nos. 5,417,202 and 5,706,717, assigned on their faces to America's Favorite Chicken Company (AFC), the entire contents of which are hereby incorporated by reference.

In a preferred embodiment of the present invention, gas fryer 10 includes a vat 12 having internal dimensions of 20"×20", 18"×18", or 14"×14", although any other desired dimensions could also be used. Heat exchanger 14 is therefore correspondingly sized to be disposed within vat 12.

There are many possible arrangements of the heating mechanism to provide heat to the cooking zone, which is the area of the vat above the heating mechanism. The area of the vat below the heating mechanism is known as the cold zone.

Figure 3:
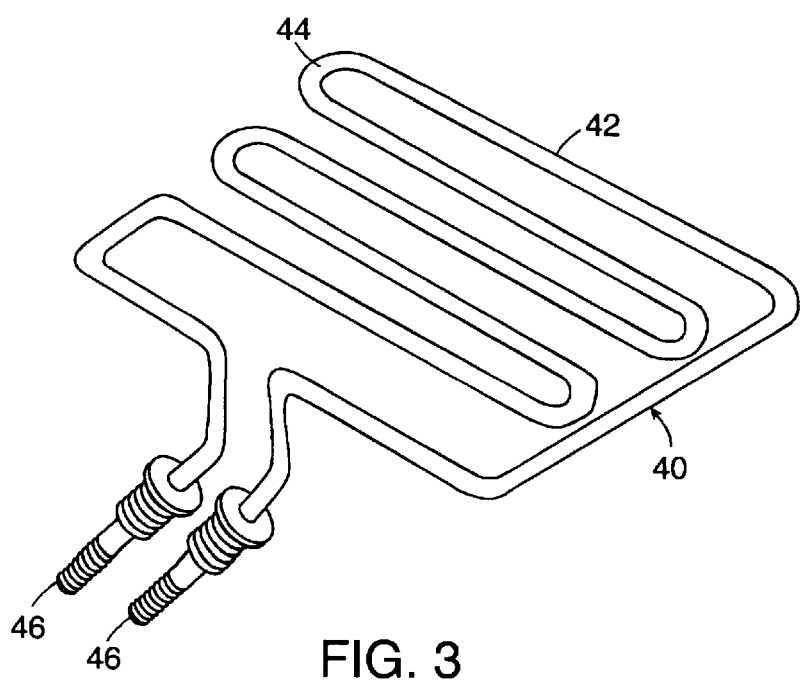
FIG. 3 is a schematic perspective view of an electric heating element of the present invention which is positioned atop the heat exchanger of FIG. 2.
Figure 4:
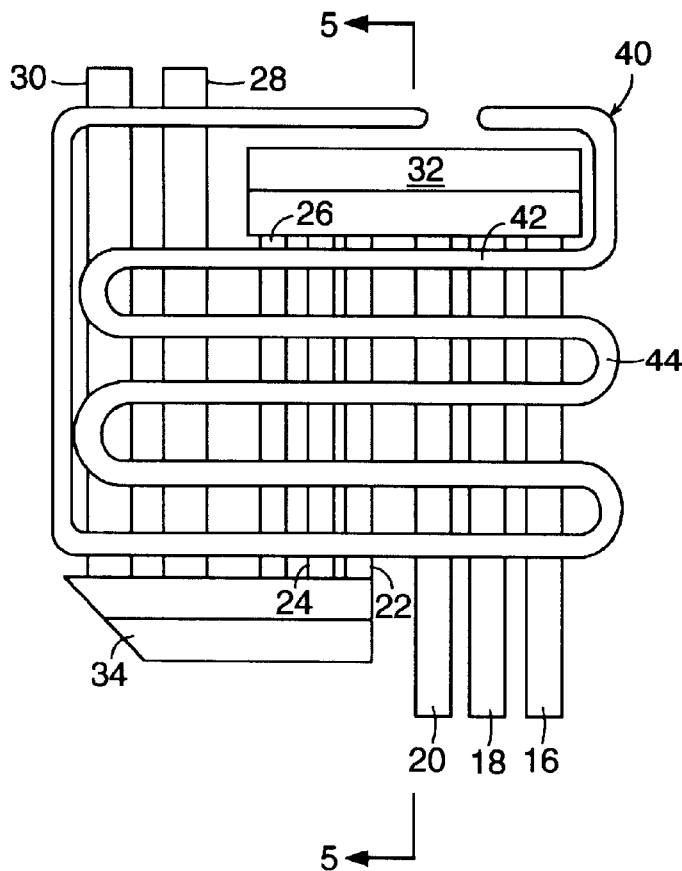
FIG. 4 is a schematic top plan view of the electric heating element of FIG. 3 shown in its installed position above the heat exchanger of FIG. 2.
Figure 5:
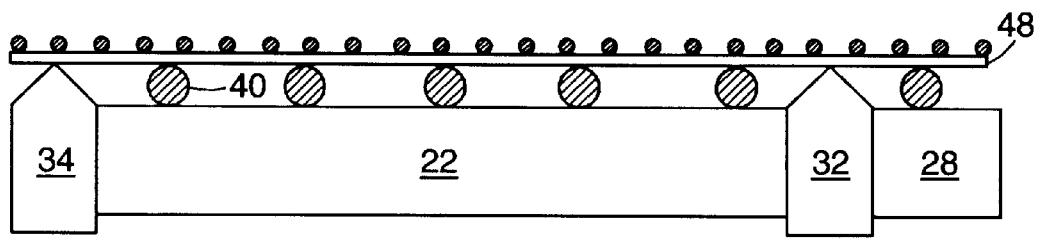
FIG. 5 is a schematic section view taken along line 5—5 of FIG. 4 and showing a grill installed above the electric heating element.

As seen in FIG. 3, a boost heater may be an electric heating element 40, formed of a number of straight portions 42 connected by turns 44. Terminals 46 connect heating element 40 to a power source (not shown). As seen in FIGS. 4, 5, heating element 40 is positioned above, and rests on, heat transfer tubes 16, 18, 20, 22, 24, 26, 28, and 30. As shown in FIG. 5, grill 48, upon which the product or basket holding the product is placed, rests on the upper edges of plenums 32, 34. As the upper edges of plenums 32, 34 are positioned above the upper edges of heat transfer tubes 16, 18, 20, 22, 24, 26, 28, and 30, providing a space therebetween, heating element 40 is conveniently disposed between grill 48 and the heat transfer tubes. This advantageously allows heating element 40 to be installed in gas fryer 10 without increasing the height of the fryer, thereby saving space and reducing manufacturing costs. This also allows heating element 40 to be installed in certain existing fryers without substantial retrofitting of the fryer, thereby providing additional cost savings. It will become obvious to those skilled in the art, given the benefit of this disclosure, that the boost heater may be placed in other locations to provide additional heating to the cooking zone of the vat.

Heating element 40 is sized based on the number of turns 42, straight portions 44, and the size of the vat 12 within which it is installed, in order to meet a designed wattage requirement. In a preferred embodiment, heating element 40 is designed so as to not exceed 35 watts/square inch. This will help to minimize adverse effects such as scorching of the shortening. In a preferred embodiment, heating element 40 is formed of stainless steel, although other suitable materials may be used as well.

Figure 6:
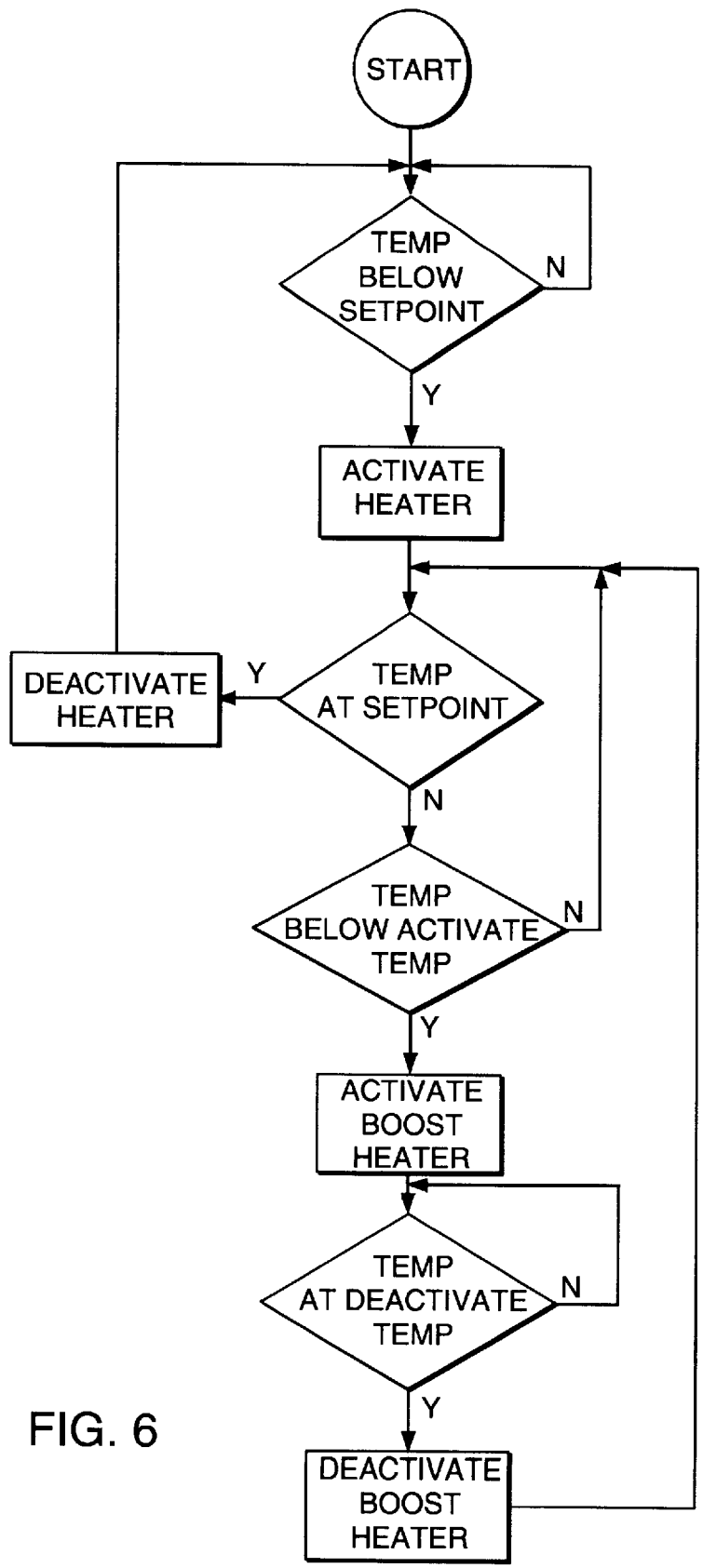
FIG. 6 is a flow chart diagram according to a first embodiment of the present invention.

In a typical fryer, the shortening is heated by heat exchanger 14 and burner 11 to maintain the temperature of the shortening at its setpoint temperature. A preferred embodiment is illustrated in FIG. 6 and shows the operation of the fryer after warm-up. When the temperature of the shortening drops below a desired minimum, or boost heater activation temperature, such as when food product is placed in the vat, heating element 40 is activated for a relatively short period of time to provide a boost mode of heating. Thus, the boost heater helps to more quickly bring the temperature of the shortening back to setpoint temperature. In certain preferred embodiments, the desired minimum temperature may be 20° to 30° below that of the setpoint temperature. Heating element 40 is preferably only operational until the shortening reaches a desired maximum, or boost heater deactivation temperature, which is below the setpoint temperature. In certain preferred embodiments, the desired maximum temperature may be approximately 5° below the setpoint temperature. When the desired maximum temperature is reached, heating element 40 is deactivated and heating continues via heat exchanger 14 and burner 11, which have continued to operate in their normal fashion. With this boost mode of heating, therefore, the desired setpoint temperature is reestablished more quickly than it would have been through the heat produced by heat exchanger 14 and burner 11 alone, helping to improve the quality of the cooked product. Thus, the electrical heating element 40 is activated in such a boost heating mode for a short period of time, while gas burner 11 operates for the bulk of the time. Therefore, the proportion of electric energy to gas energy during a day's use of the fryer can be very small, providing economic operation approaching that of a gas-only fryer, while cooking quality and cooking production can be that of a fast-recovering electric fryer. Since the warm-up cycle does not usually need to be performed quickly, the boost heater is typically not made available for activation until warm-up is completed, thereby realizing additional energy savings.

Figure 7:
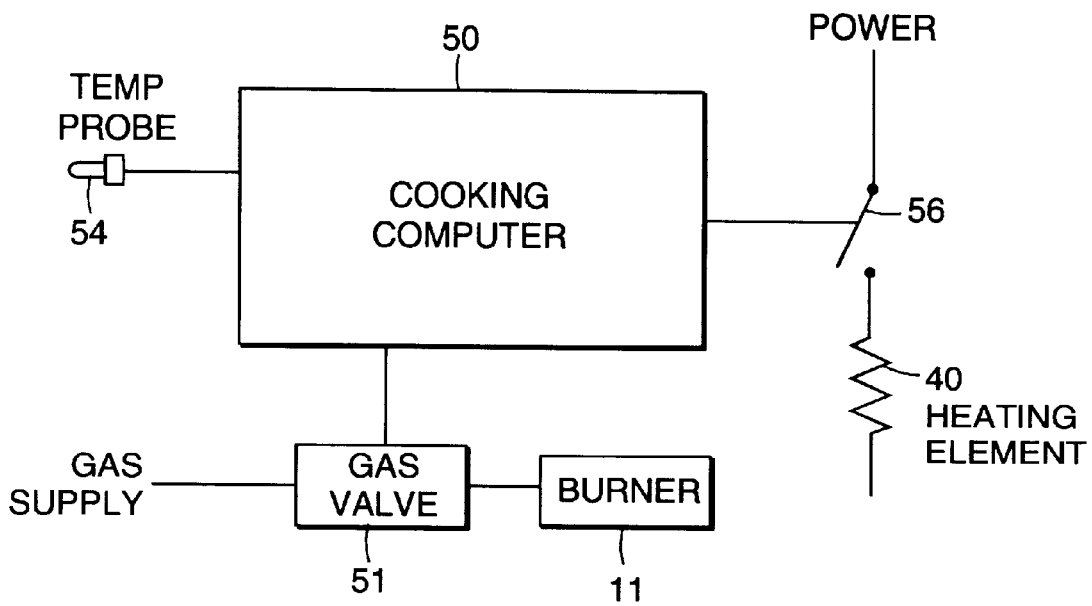
FIG. 7 is a schematic electrical diagram of the embodiment of FIG. 6.

Referring to FIG. 7, in a preferred embodiment of the present invention, a cooking computer 50 is used to regulate the operation of the boost heater. Computer 50 controls the operation of burner 11 by opening and closing gas valve 51 to maintain the temperature of the shortening at its setpoint temperature. When the temperature probe 54 senses that the temperature of the shortening has dropped below the desired minimum temperature, such as when food product is dropped into the vat, switch 56 is closed to activate heating element 40. When probe 54 senses that the temperature of the shortening has reached a desired maximum temperature, which is preferably below the setpoint temperature for the shortening, switch 56 is opened to deactivate heating element 40. Burner 11 continues to operate in its normal fashion to maintain the temperature of the shortening at the setpoint temperature.

It is to be appreciated that controlling the operation of heating element 40 by a cooking computer is one preferred embodiment, and that sensors and relays could also be used to implement the boost heating mode as well. Such required sensors and relays will become readily apparent to those skilled in the art given the benefit of this disclosure.

Heating element 40 may be used with an electric fryer as well. Since heating element 40 operates for only a relatively short length of time, heating element 40 can therefore be of a size and rating which is lesser than that of the main electric heating element used in the electric fryer.

Figure 8:
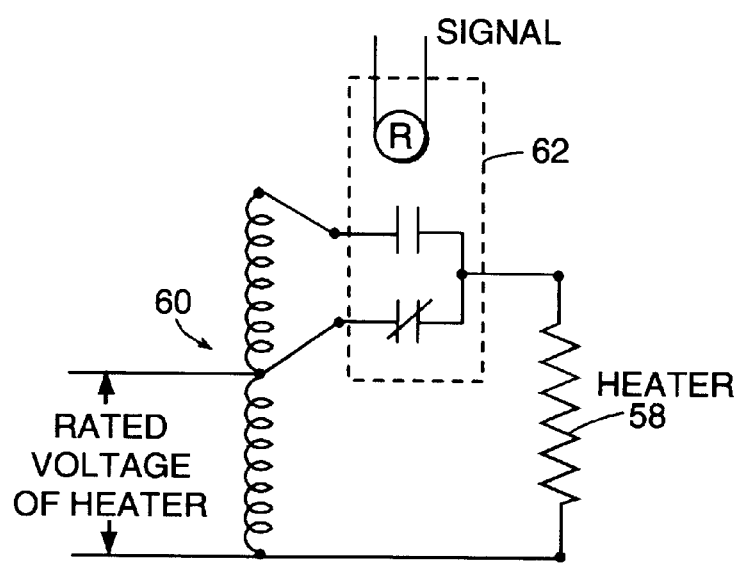
FIG. 8 is a schematic electrical diagram of a second embodiment of the present invention.

Another embodiment of the boost heater of the present invention which is used with an electric fryer is shown in FIG. 8. The boost heating mode is produced by activating the main electric heating element 58 via an overvoltage provided by an autotransformer 60. The overvoltage is provided only from the time when the temperature of the shortening falls below the desired minimum temperature until it reaches the desired maximum temperature. When a signal is received, indicating that the boost heater should be activated, normally closed relay 62 connects electric heating element 58 to the step up voltage of autotransformer 60. Since the boost heating mode is only operational for a relatively short time, the autotransformer 60 and electric heating element 58 need not be sized for the higher rating required for full time operation at this higher level. Such a transient load on autotransformer 60 and electric heating element 58 will not have significant adverse effects on autotransformer 60 or electric heating element 58.

In light of the foregoing disclosure of the invention and description of the preferred embodiments, those skilled in this area of technology will readily understand that various modifications and adaptations can be made without departing from the true scope and spirit of the invention. All such modifications and adaptations are intended to be covered by the following claims.

What is claimed is:

1. A fryer system comprising, in combination:
   a fryer including a vat for containing shortening therein;
   a temperature sensor to detect a temperature of the shortening in the vat;
   a first heating means supplying heat to the vat at a full output level whenever the temperature sensor detects that the temperature of the shortening is below a setpoint temperature; and
   a second heating means supplying heat to the vat, the second heating means operating only after the first heating means has initially heated the shortening until it has reached the setpoint temperature.

2. A fryer system according to claim 1, wherein the second heating means supplies heat to the vat from a time when the temperature of the shortening is below a predetermined minimum temperature until the temperature of the shortening reaches a predetermined maximum temperature.

3. A fryer system according to claim 2, wherein the predetermined maximum temperature is below the setpoint temperature.

4. A fryer system according to claim 1, wherein the first heating means comprises a heat exchanger with a gas burner.

5. A fryer system according to claim 1, wherein the second heating means comprises an electric heating element.

6. A fryer system according to claim 1, wherein the first heating means comprises an electric heating element and the second heating means comprises an autotransformer supplying an overvoltage to the electric heating element.

7. A fryer system according to claim 6, wherein the second heating means supplies heat to the vat from a time when the temperature of the shortening is below a predetermined minimum temperature until the temperature of the shortening reaches a predetermined maximum temperature.

8. A fryer system according to claim 7, wherein the predetermined maximum temperature is below the setpoint temperature.

9. A fryer system according to claim 1, further comprising control means for controlling the first and second heating means.

10. The fryer system according to claim 1, wherein the first heating means is located proximate the second heating means.

11. A fryer system comprising, in combination:
    a fryer including a vat for containing shortening therein;
    a temperature sensor to detect a temperature of shortening in the vat;
    a heat exchanger having a gas burner for supplying heat to a cooking zone of the vat at a full output level whenever the temperature sensor detects a temperature below a setpoint temperature; and
    an electric heating element for supplying heat to the cooking zone of the vat only after the heat exchanger has initially heated shortening in the vat to the setpoint temperature.

12. A fryer system according to claim 11, further comprising control means for controlling the heat exchanger and the electric heating element.

13. A fryer system according to claim 12, wherein the control means controls the heat exchanger to maintain the setpoint temperature of the shortening, activates the electric heating element when a temperature of the shortening drops below a predetermined minimum temperature, and deactivates the electric heating element when the temperature of the shortening reaches a predetermined maximum temperature.

14. A fryer system according to claim 13, wherein the maximum temperature is below the setpoint temperature.

15. The fryer system according to claim 11, wherein the electric heating element is located proximate the heat exchanger.

16. A method of operating a heating system for a fryer comprising the steps of:
    placing a quantity of shortening within a fryer vat;
    sensing the temperature of the shortening by means of a temperature sensor;
    activating a first heating means to produce heat at a full output level until the temperature sensed by the temperature sensor reaches a setpoint temperature and whenever the temperature sensed by the temperature sensor falls below the setpoint temperature;
    activating a second heating means only after the shortening has initially reached the setpoint temperature when the temperature sensed by the temperature sensor falls below a predetermined minimum temperature which is below the setpoint temperature; and
    deactivating the second heating means when the temperature sensed by the temperature sensor reaches a predetermined maximum temperature which is above the minimum temperature and below the setpoint temperature.

17. The method of claim 16, wherein the first heating means comprises a heat exchanger with a gas burner.

18. The method of claim 16, wherein the second heating means comprises an electric heating element.

19. The method of claim 16, wherein the first heating means comprises an electric heating element and the second heating means comprises an autotransformer supplying an overvoltage to the electric heating element.

* * * * *